US011217206B2

(12) United States Patent
Shin

(10) Patent No.: US 11,217,206 B2
(45) Date of Patent: Jan. 4, 2022

(54) DISPLAY DEVICE, MOBILE DEVICE INCLUDING THE SAME, AND METHOD OF OPERATING DISPLAY DEVICE

(71) Applicant: Samsung Display Co., Ltd., Yongin-Si (KR)

(72) Inventor: Hyung-Min Shin, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 900 days.

(21) Appl. No.: 15/234,251

(22) Filed: Aug. 11, 2016

(65) Prior Publication Data

US 2017/0061934 A1 Mar. 2, 2017

(30) Foreign Application Priority Data

Aug. 24, 2015 (KR) ........................ 10-2015-0118732

(51) Int. Cl.

| | |
|---|---|
| ***G06F 3/041*** | (2006.01) |
| ***G09G 5/18*** | (2006.01) |
| ***G09G 3/20*** | (2006.01) |
| *G04G 9/02* | (2006.01) |

(52) U.S. Cl.

CPC ................. *G09G 5/18* (2013.01); *G09G 3/20* (2013.01); *G04G 9/02* (2013.01); *G09G 2310/08* (2013.01); *G09G 2320/0626* (2013.01); *G09G 2330/021* (2013.01)

(58) Field of Classification Search

CPC ........................................................ G04G 9/00
USPC ............................................................ 368/10
See application file for complete search history.

(56) References Cited

U.S. PATENT DOCUMENTS

| | | | | |
|---|---|---|---|---|
| 7,257,254 B2 * | 8/2007 | Tunney | G06K 9/00 | 345/179 |
| 7,907,476 B2 * | 3/2011 | Lee | G04G 5/04 | 345/173 |
| 2001/0030645 A1 * | 10/2001 | Tsutsui | G09G 3/3611 | 345/211 |
| 2008/0088548 A1 * | 4/2008 | Lee | G09G 3/3225 | 345/77 |
| 2008/0186808 A1 * | 8/2008 | Lee | G04G 5/04 | 368/10 |
| 2015/0346843 A1 * | 12/2015 | Piquerez | G04G 21/04 | 345/156 |

FOREIGN PATENT DOCUMENTS

| | | |
|---|---|---|
| CN | 201690507 U | 12/2010 |
| CN | 102768627 A | 11/2012 |
| CN | 103069476 A | 4/2013 |

(Continued)

OTHER PUBLICATIONS

Chinese Office Action for Application No. 201610586358.6 dated Oct. 20, 2020.

*Primary Examiner* — Roy P Rabindranath
(74) *Attorney, Agent, or Firm* — Cantor Colburn LLP

(57) ABSTRACT

A display device includes a display panel including a plurality of pixels and a drive circuit which displays an image, which corresponds to input data received from outside, on the display panel in a normal operation mode, and displays an image, which corresponds to an analog clock representing a current time, on the display panel based on end point coordinates of clock hands that are internally stored in the drive circuit in a standby mode.

18 Claims, 11 Drawing Sheets

(56) References Cited

FOREIGN PATENT DOCUMENTS

| | | | |
|---|---|---|---|
| CN | 103279025 | A | 9/2013 |
| CN | 104765266 | A | 7/2015 |
| KR | 1020110013689 | A | 2/2011 |

* cited by examiner

DISPLAY DEVICE, MOBILE DEVICE INCLUDING THE SAME, AND METHOD OF OPERATING DISPLAY DEVICE

This application claims priority to Korean Patent Application No. 10-2015-0118732, filed on Aug. 24, 2015, and all the benefits accruing therefrom under 35 U.S.C. § 119, the content of which in its entirety is herein incorporated by reference.

BACKGROUND

1. Field

Exemplary embodiments relate to a display device, and more particularly to a display device included in a mobile device.

2. Description of the Related Art

Recently, a smart watch having a shape of a watch and various functions such as a health has been developed.

Since the smart watch displays a current time on a display device although the smart watch is in a standby mode, the smart watch consumes powers even in the standby mode.

SUMMARY

A smart watch operates using a battery. Therefore, when power consumption of the smart watch in a standby mode increases, a battery time of the smart watch decreases.

Exemplary embodiments are directed to provide a display device that decreases power consumption in a standby mode.

Exemplary embodiments are directed to provide a mobile device including the display device.

Exemplary embodiments are directed to provide a method of operating the display device.

According to exemplary embodiments, a display device includes a display panel and a drive circuit. The display panel includes a plurality of pixels. The drive circuit displays an image, which corresponds to input data received from outside, on the display panel in a normal operation mode. The drive circuit displays an image, which corresponds to an analog clock representing a current time, on the display panel based on end point coordinates of clock hands that are internally stored in the drive circuit in a standby mode.

In exemplary embodiments, in the standby mode, the drive circuit may generate an internal clock signal, determine a current hour hand coordinate and a current minute hand coordinate among the end point coordinates of clock hands based on the internal clock signal, and display a current hour hand line, which connects a reference coordinate that is internally stored in the drive circuit and the current hour hand coordinate, and a current minute hand line, which connects the reference coordinate and the current minute hand coordinate, on the display panel.

In exemplary embodiments, the drive circuit may include a gate driver coupled to the display panel through a plurality of gate lines, a source driver coupled to the display panel through a plurality of data lines, and a controller which controls operations of the gate driver and the source driver. The controller may generate image data corresponding to the input data and provide the image data to the source driver in the normal operation mode. The controller may generate image data corresponding to the analog clock representing the current time based on the end point coordinates of clock hands and an internal clock signal and provide the image data to the source driver in the standby mode.

In an exemplary embodiment, the controller may include a register which stores the end point coordinates of clock hands and a reference coordinate corresponding to a center of the analog clock, an internal clock generator which generates the internal clock signal, and a control circuit. The control circuit may generate the image data by dividing the input data in a unit of a frame and provide the image data to the source driver in the normal operation mode. The control circuit may determine the current time based on the internal clock signal, determine a current hour hand coordinate and a current minute hand coordinate, which correspond to the current time, among the end point coordinates of clock hands, generate the image data including a current hour hand line, which connects the reference coordinate and the current hour hand coordinate, and a current minute hand line, which connects the reference coordinate and the current minute hand coordinate, and provide the image data to the source driver in the standby mode.

In an exemplary embodiment, the register may include a first register which stores hour hand coordinates representing locations of end points of an hour hand at a predetermined time interval, a second register which stores minute hand coordinates representing locations of end points of a minute hand at every minute, and a third register which stores the reference coordinate.

In an exemplary embodiment, in the standby mode, the control circuit may determine the current hour hand coordinate, which corresponds to the current time, among the hour hand coordinates stored in the first register, and determine the current minute hand coordinate, which corresponds to the current time, among the minute hand coordinates stored in the second register.

In an exemplary embodiment, in the standby mode, the control circuit may determine the current hour hand coordinate by circularly selecting the hour hand coordinates stored in the first register at each of the predetermined time interval, and determine the current minute hand coordinate by circularly selecting the minute hand coordinates stored in the second register whenever a minute of the current time is changed.

In an exemplary embodiment, in the standby mode, the control circuit may determine a next minute hand coordinate, which corresponds to a next minute of the current hour, among the end point coordinates of clock hands during an overlap period, which is between a first time at which a minute of the current time is changed and a second time that is prior to the first time by a first time period, generate the image data including the current hour hand line, the current minute hand line, and a next minute hand line, which connects the reference coordinate and the next minute hand coordinate, and provide the image data to the source driver.

In an exemplary embodiment, the current hour hand line and the current minute hand line included in the image data may have a first gray level, and the next minute hand line included in the image data may have a second gray level lower than the first gray level.

In an exemplary embodiment, in the standby mode, the source driver may display the current hour hand line and the current minute hand line on the display panel with a first brightness and display the next minute hand line on the display panel with a second brightness lower than the first brightness based on the image data received from the control circuit.

In an exemplary embodiment, a duration of the overlap period may be predetermined.

In an exemplary embodiment, the control circuit may adjust a duration of the overlap period based on an overlap control signal.

According to exemplary embodiments, a mobile device includes an application processor and a display device. The application processor generates a mode signal having a first logic level and outputs input data in a normal operation mode, and generates the mode signal having a second logic level and stops outputting the input data in a standby mode. The display device receives the mode signal, displays an image corresponding to the input data in the normal operation mode, and displays an image corresponding to an analog clock representing a current time based on end point coordinates of clock hands that are internally stored in the display device in a standby mode.

In exemplary embodiments, the display device may include a display panel including a plurality of pixels, a gate driver coupled to the display panel through a plurality of gate lines, a source driver coupled to the display panel through a plurality of data lines, and a controller which controls operations of the gate driver and the source driver. The controller may receive the mode signal. The controller may generate image data corresponding to the input data and provide the image data to the source driver in the normal operation mode. The controller may generate image data corresponding to the analog clock representing the current time based on the end point coordinates of clock hands and an internal clock signal and provide the image data to the source driver in the standby mode.

In an exemplary embodiment, the controller may include a register which store the end point coordinates of clock hands and a reference coordinate corresponding to a center of the analog clock, an internal clock generator which generates the internal clock signal, and control circuit. The control circuit may generate the image data by dividing the input data in a unit of a frame and provide the image data to the source driver in the normal operation mode. The control circuit may determine the current time based on the internal clock signal, determine a current hour hand coordinate and a current minute hand coordinate, which correspond to the current time, among the end point coordinates of clock hands, generate the image data including a current hour hand line, which connects the reference coordinate and the current hour hand coordinate, and a current minute hand line, which connects the reference coordinate and the current minute hand coordinate, and provide the image data to the source driver in the standby mode.

In an exemplary embodiment, in the standby mode, the control circuit may determine a next minute hand coordinate, which corresponds to a next minute of the current hour, among the end point coordinates of clock hands during an overlap period, which is between a first time at which a minute of the current time is changed and a second time that is prior to the first time by a first time period, generate the image data, which include the current hour hand line and the current minute hand line with a first gray level, and a next minute hand line connecting the reference coordinate and the next minute hand coordinate with a second gray level lower than the first gray level, and provide the image data to the source driver.

In an exemplary embodiment, the mobile device may correspond to a smart watch.

In a method of operating a display device, an operation mode is determined. An image, which corresponds to input data received from outside, is displayed on a display panel when the operation mode is a normal operation mode. An image, which corresponds to an analog clock representing a current time, is displayed on the display panel based on end point coordinates of clock hands that are internally stored in the display device when the operation mode is a standby mode.

In exemplary embodiments, displaying the image, which corresponds to the analog clock representing the current time, on the display panel based on the end point coordinates of clock hands when the operation mode is the standby mode may include determining the current time based on an internal clock signal, determining a current hour hand coordinate and a current minute hand coordinate, which correspond to the current time, among the end point coordinates of clock hands, generating image data corresponding to the analog clock that includes a current hour hand line, which connects a reference coordinate that is internally stored in the display device and the current hour hand coordinate, and a current minute hand line, which connects the reference coordinate and the current minute hand coordinate, and displaying the image data on the display panel.

In an exemplary embodiment, displaying the image, which corresponds to the analog clock representing the current time, on the display panel based on the end point coordinates of clock hands when the operation mode is the standby mode may further include determining a next minute hand coordinate, which corresponds to a next minute of the current hour, among the end point coordinates of clock hands during an overlap period, which is between a first time at which a minute of the current time is changed and a second time that is prior to the first time by a first time period, and generating the image data, which include the current hour hand line and the current minute hand line with a first gray level, and a next minute hand line connecting the reference coordinate and the next minute hand coordinate with a second gray level lower than the first gray level.

Therefore, the mobile device according to exemplary embodiments may reduce power consumption in the standby mode since the display device internally generates an image corresponding to an analog clock representing a current time and display the image in the standby mode.

In addition, since the display device pre-displays the next minute hand line with a low brightness and increases the brightness of the next minute hand line when a minute of the current time is changed, a color bleed of the display device may be effectively reduced.

BRIEF DESCRIPTION OF THE DRAWINGS

Illustrative, non-limiting exemplary embodiments will be more clearly understood from the following detailed description in conjunction with the accompanying drawings, in which.

DETAILED DESCRIPTION

Figure 1:
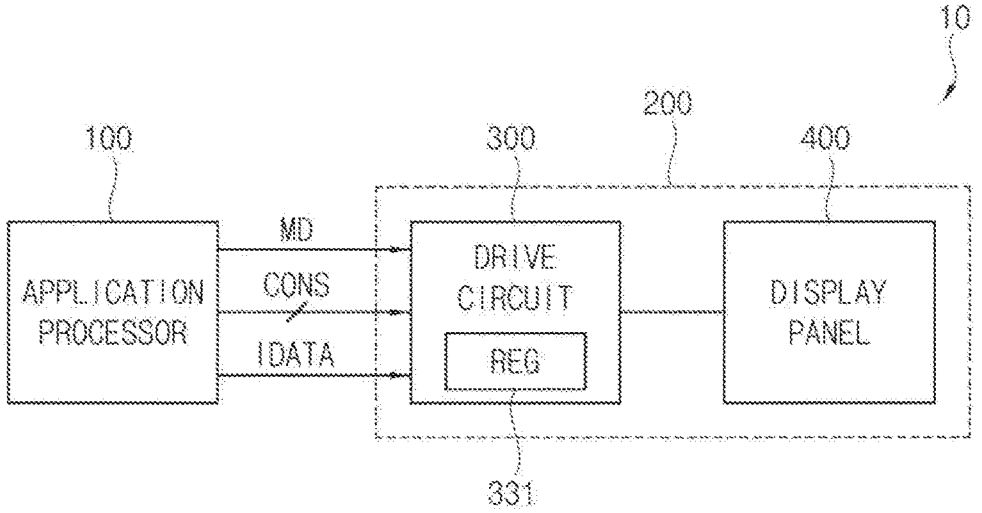
FIG. 1 is a block diagram illustrating exemplary embodiments of a mobile device.

Hereinafter, the invention will be explained in detail with reference to the accompanying drawings.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). In an exemplary embodiment, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a block diagram illustrating a mobile device according to exemplary embodiments.

Referring to FIG. 1, a mobile device 10 includes an application processor 100 and a display device 200.

In a normal operation mode in which the mobile device 10 operates based on a command from a user, the mobile device 10 displays an image generated by the application processor 100 on the display device 200.

In a standby mode in which the mobile device 10 is not used by the user and waits for a command from the user, the application processor 100 enters an idle state, and the display device 200 internally generates an image corresponding to an analog clock representing a current time and displays the image.

Figure 2:
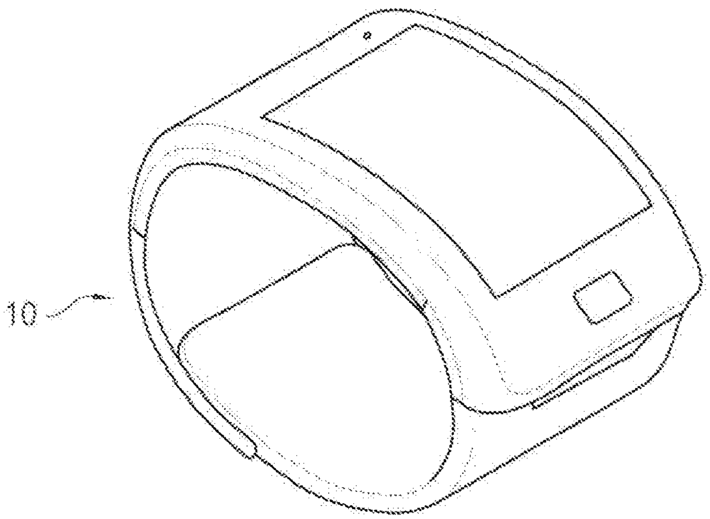
FIG. 2 is a diagram illustrating an exemplary embodiment of the mobile device.

In exemplary embodiments, as illustrated in FIG. 2, the mobile device 10 may correspond to a smart watch. However, exemplary embodiments are not limited thereto. In other exemplary embodiments, the mobile device 10 may be various other wearable electronic devices such as a wrist band type electronic device, a necklace type electronic device, etc., for example.

The display device 200 may include a drive circuit 300 and a display panel 400.

In an operation of the mobile device 10, the application processor 100 may provide a mode signal MD, which has a first logic level in the normal operation mode and has a second logic level in the standby mode, to the drive circuit 300.

In exemplary embodiments, the first logic level may be a logic high level, and the second logic level may be a logic low level. In other exemplary embodiments, the first logic level may be a logic low level, and the second logic level may be a logic high level.

The drive circuit 300 may determine an operation mode based on a logic level of the mode signal MD. In addition, the drive circuit 300 may internally store end point coordinates of clock hands, which includes end point coordinates of an hour hand and end point coordinates of a minute hand.

In the normal operation mode, the application processor 100 may provide control signals CONS and input data IDATA to the drive circuit 300, and the drive circuit 300 may display an image corresponding to the input data IDATA on the display panel 400 based on the control signals CONS.

In the standby mode, the application processor 100 may stop outputting the control signals CONS and the input data IDATA to enter in the idle state. The drive circuit 300 may display an image corresponding to the analog clock representing the current time on the display panel 400 based on the end point coordinates of clock hands.

In exemplary embodiments, the drive circuit 300 may include a register REG 331 storing the end point coordinates of clock hands. In the standby mode, the drive circuit 300 may determine a current hour hand coordinate, which corresponds to an end point of an hour hand representing the current time, and a current minute hand coordinate, which corresponds to an end point of a minute hand representing the current time, among the end point coordinates of clock hands stored in the register 331. Then, the drive circuit 300 may display a current hour hand line, which connects a reference coordinate that is internally stored in the drive circuit 300 and corresponds to a center of the analog clock and the current hour hand coordinate, and a current minute hand line, which connects the reference coordinate and the current minute hand coordinate, on the display panel 400, such that the image corresponding to the analog clock representing the current time may be displayed on the display panel 400.

Figure 3:
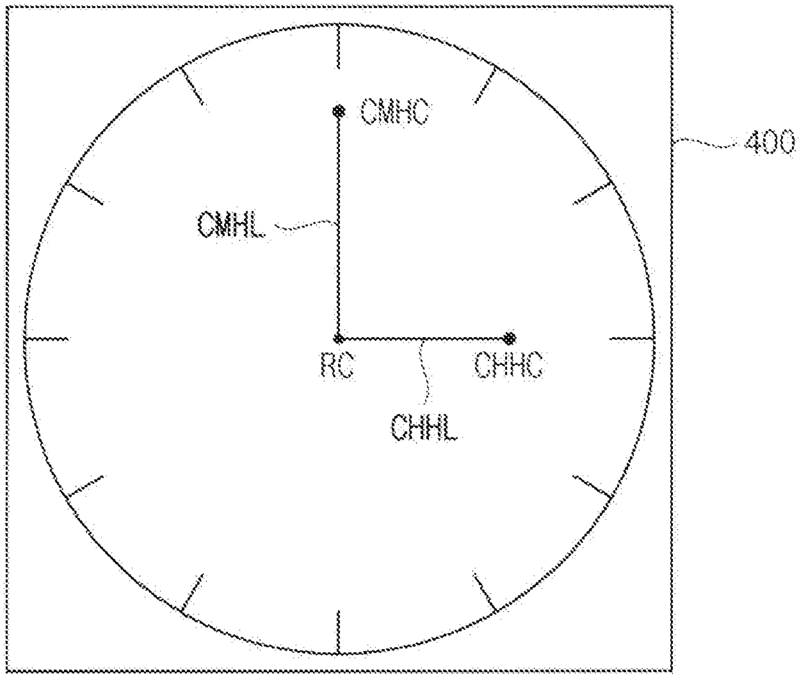
FIG. 3 is a diagram illustrating an exemplary embodiment of an image displayed on a display panel included in the mobile device of FIG. 1 in a standby mode.

FIG. 3 is a diagram illustrating an exemplary embodiment of an image displayed on a display panel included in the mobile device of FIG. 1 in a standby mode.

In FIG. 3, an image displayed on the display panel 400 in the standby mode when the current time is three o'clock is illustrated as an example.

As illustrated in FIG. 3, in the standby mode, the drive circuit 300 may determine the current hour hand coordinate CHHC, which corresponds to an end point of the hour hand representing the current time of three o'clock, for example, and the current minute hand coordinate CMHC, which corresponds to an end point of the minute hand representing the current time of three o'clock, among the end point coordinates of clock hands stored in the register 331. Then, the drive circuit 300 may display the current hour hand line CHHL, which connects the reference coordinate RC and the current hour hand coordinate CHHC, and the current minute hand line CMHL, which connects the reference coordinate RC and the current minute hand coordinate CMHC, on the display panel 400, such that the image corresponding to the analog clock representing the current time may be displayed on the display panel 400.

Fixed images included in the analog clock except for the current hour hand line CHHL and the current minute hand line CMHL may be prestored in the drive circuit 300 as an image data.

Figure 4:
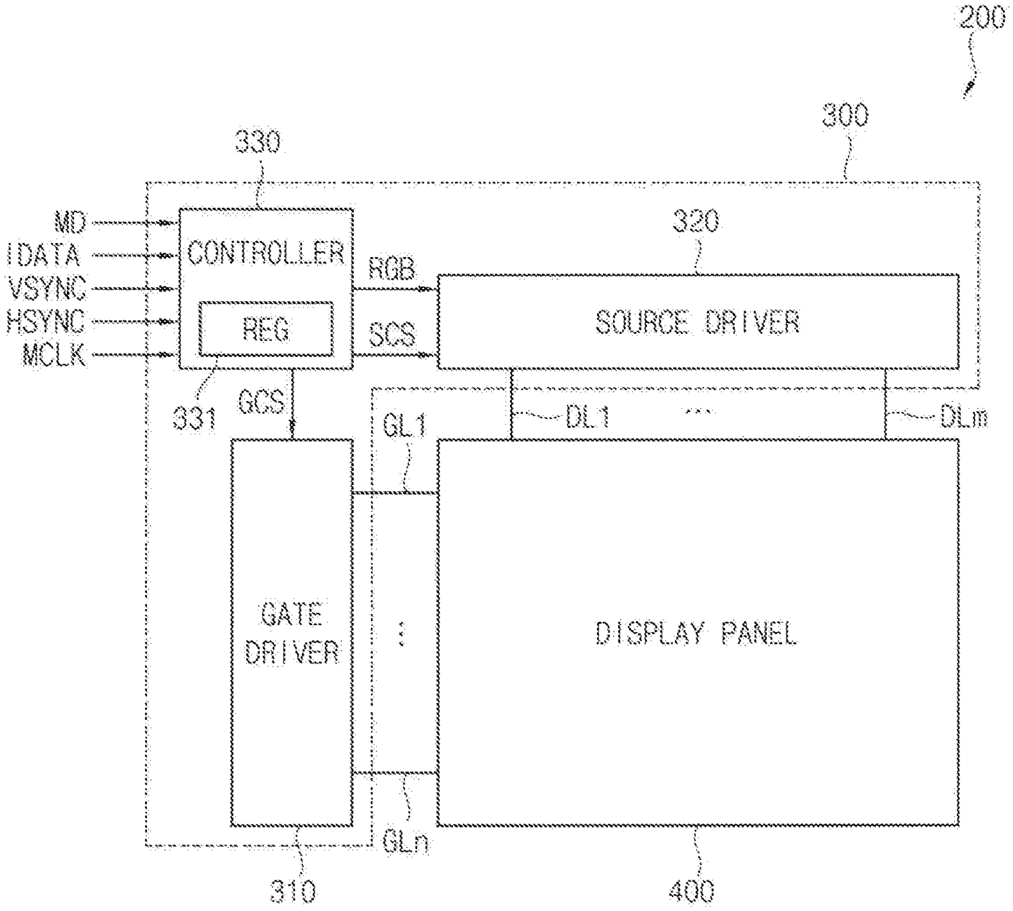
FIG. 4 is a block diagram illustrating an exemplary embodiment of a display device included in the mobile device of FIG. 1.

FIG. 4 is a block diagram illustrating an exemplary embodiment of a display device included in the mobile device of FIG. 1.

Referring to FIG. 4, the display device 200 may include the drive circuit 300 and the display panel 400, and the drive circuit 300 may include a gate driver 310, a source driver 320, and a controller 330.

The display panel 400 may include a plurality of pixels disposed in rows and columns.

The gate driver 310 may be coupled to the plurality of pixels included in the display panel 400 through a plurality of gate lines GL1 to GLn.

The source driver 320 may be coupled to the plurality of pixels included in the display panel 400 through a plurality of data lines DL1 to DLm.

Here, n and m represent positive integers.

The controller 330 may control operations of the gate driver 310 and the source driver 320 to display an image on the display panel 400.

The controller 330 may receive the mode signal MD from the application processor 100 (refer to FIG. 1) and determine the operation mode based on the mode signal MD.

In the normal operation mode, the controller 330 may receive the input data IDATA, a horizontal synchronization signal HSYNC, a vertical synchronization signal VSYNC, and a main clock signal MCLK. The controller 330 may generate a gate control signal GCS and a source control signal SCS based on the horizontal synchronization signal HSYNC, the vertical synchronization signal VSYNC, and the main clock signal MCLK. In addition, the controller 330 may divide the input data IDATA in a unit of a frame to generate image data RGB.

In exemplary embodiments, the image data RGB may include red image data corresponding to red pixels included in the display panel 400, green image data corresponding to green pixels included in the display panel 400, and blue image data corresponding to blue pixels included in the display panel 400, for example.

In the standby mode, since the application processor 100 is in the idle state, the controller 330 may not receive the input data IDATA, the horizontal synchronization signal HSYNC, the vertical synchronization signal VSYNC, and the main clock signal MCLK from the application processor 100. The controller 330 may generate the gate control signal GCS and the source control signal SCS based on an internal clock signal that is generated internally. In addition, the controller 330 may include the register 331 storing the end point coordinates of clock hands, which includes the end point coordinates of an hour hand and the end point coordinates of a minute hand. The controller 330 may generate the image data RGB corresponding to the analog clock representing the current time based on the end point coordinates of clock hands stored in the register 331 and the internal clock signal.

The controller 330 may provide the gate control signal GCS to the gate driver 310, and provide the source control signal SCS to the source driver 320.

The gate driver 310 may consecutively select the plurality of gate lines GL1 to GLn based on the gate control signal GCS.

The source driver 320 may generate a plurality of driving voltages by processing the image data RGB based on the source control signal SCS, and provide the plurality of driving voltages to the display panel 400 through the plurality of data lines DL1 to DLm to display an image corresponding to the image data RGB on the display panel 400.

In an exemplary embodiment, the source driver 320 may generate a red driving voltage corresponding to the red image data, a green driving voltage corresponding to the green image data, and a blue driving voltage corresponding to the blue image data, and provide the red driving voltage, the green driving voltage, and the blue driving voltage to the red pixels, the green pixels, and the blue pixels of the display panel 400, respectively, through the plurality of data lines DL1 to DLm to display the image corresponding to the image data RGB on the display panel 400, for example.

Figure 5:
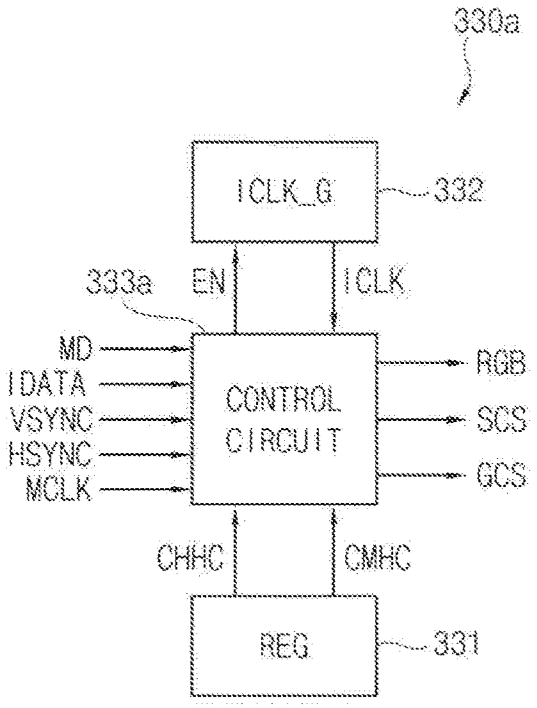
FIG. 5 is a block diagram illustrating an exemplary embodiment of a controller included in the display device of FIG. 4.

FIG. 5 is a block diagram illustrating an exemplary embodiment of a controller included in the display device of FIG. 4.

Referring to FIG. 5, a controller 330*a* may include a register 331, an internal clock generator ICLK_G 332, and a control circuit 333*a*.

The register 331 may store the end point coordinates of clock hands, and the reference coordinate RC corresponding to a center of the analog clock.

Figure 6:
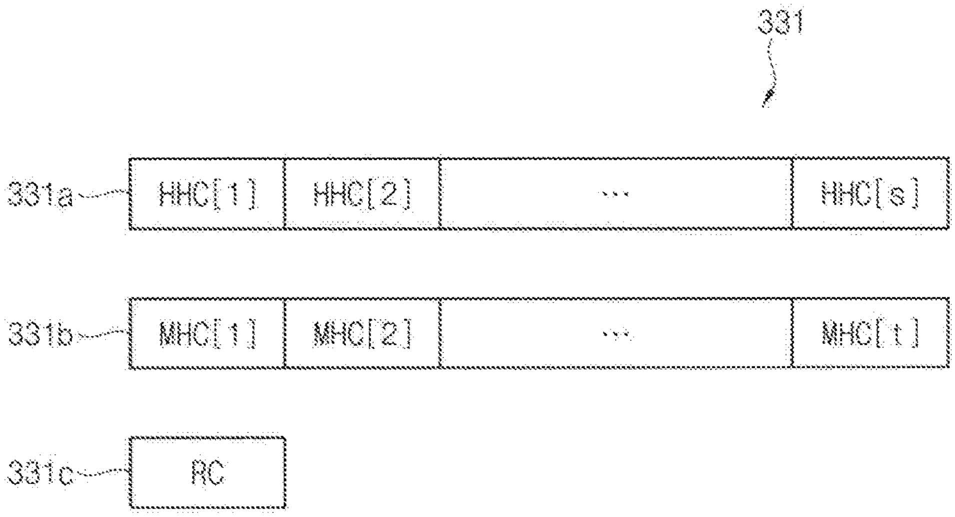
FIG. 6 is a diagram illustrating an exemplary embodiment of a register included in the controller of FIG. 5.
Figure 7:
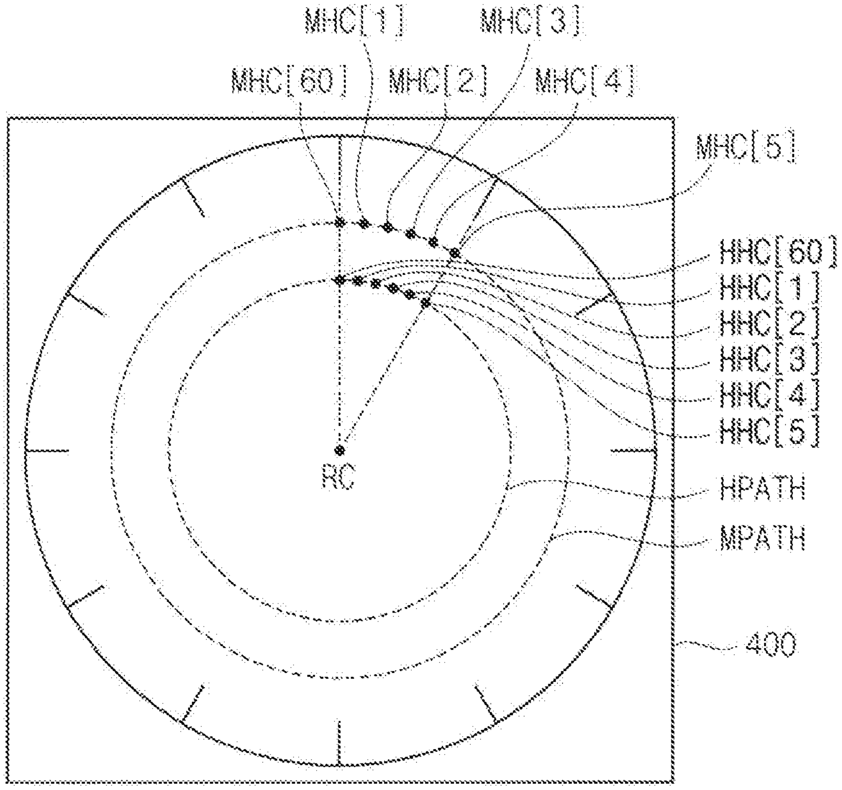
FIG. 7 is a diagram for describing hour hand coordinates, minute hand coordinates, and a reference coordinate included in the register of FIG. 6.

FIG. 6 is a diagram illustrating an exemplary embodiment of a register included in the controller of FIG. 5, and FIG. 7 is a diagram for describing hour hand coordinates, minute hand coordinates, and a reference coordinate included in the register of FIG. 6.

Referring to FIGS. 6 and 7, the register 331 may include a first register 331*a*, a second register 331*b*, and a third register 331*c*.

The first register 331*a* may consecutively store hour hand coordinates HHC[1], HHC[2], . . . , HHC[s] representing locations of end points of an hour hand on the display panel 400 at a predetermined first time interval. Here, s represents a positive integer.

As illustrated in FIG. 7, the hour hand coordinates HHC [1], HHC[2], . . . , HHC[s] may be on an hour hand path HPATH having a first radius with a center of the reference coordinate RC.

In an exemplary embodiment, when the first register 331*a* consecutively stores the hour hand coordinates HHC[1], HHC[2], . . . , HHC[s] representing locations of end points of an hour hand on the display panel 400 at every 12 minutes, as illustrated in FIG. 7, the first register 331*a* may consecutively store sixty hour hand coordinates HHC[1], HHC[2], . . . , HHC[60] located on the hour hand path HPATH, for example.

However, exemplary embodiments are not limited thereto. In other exemplary embodiments, the first register 331*a* may consecutively store the hour hand coordinates HHC[1], HHC[2], . . . , HHC[s] representing locations of end points of an hour hand on the display panel 400 at any time interval.

The second register 331*b* may consecutively store minute hand coordinates MHC[1], MHC[2], . . . , MHC[t] representing locations of end points of a minute hand on the display panel 400 at a predetermined second time interval. Here, t represents a positive integer.

As illustrated in FIG. 7, the minute hand coordinates MHC[1], MHC[2], . . . , MHC[t] may be on a minute hand path MPATH having a second radius with a center of the reference coordinate RC.

In an exemplary embodiment, when the second register 331*b* consecutively stores the minute hand coordinates MHC[1], MHC[2], . . . , MHC[t] representing locations of end points of a minute hand on the display panel 400 at every minute, as illustrated in FIG. 7, the second register 331*b* may consecutively store sixty minute hand coordinates MHC[1], MHC[2], . . . , MHC[60] located on the minute hand path MPATH, for example.

However, exemplary embodiments are not limited thereto. In other exemplary embodiments, the second register 331*b* may consecutively store the minute hand coordinates MHC[1], MHC[2], . . . , MHC[t] representing locations of end points of a minute hand on the display panel 400 at any time interval.

Hereinafter, for ease of explanation, it will be assumed that the second register 331*b* consecutively stores the minute hand coordinates MHC[1], MHC[2], . . . , MHC[60] representing locations of end points of a minute hand on the display panel 400 at every minute.

The third register 331*c* may store the reference coordinate RC corresponding to the center of the analog clock.

Referring back to FIG. 5, the control circuit 333*a* may receive the mode signal MD from the application processor 100, and determine the operation mode based on the mode signal MD.

In the normal operation mode, the control circuit 333*a* may provide an enable signal EN in a deactivated state, e.g., a state in which the enable signal EN has a logic low value, to the internal clock generator 332. The internal clock generator 332 may be turned off in response to the enable signal EN in the deactivated state.

In the normal operation mode, the control circuit 333*a* may receive the input data IDATA, the horizontal synchronization signal HSYNC, the vertical synchronization signal VSYNC, and the main clock signal MCLK from the application processor 100. The control circuit 333*a* may generate the gate control signal GCS and the source control signal SCS based on the horizontal synchronization signal HSYNC, the vertical synchronization signal VSYNC, and the main clock signal MCLK. In addition, the control circuit 333*a* may divide the input data IDATA in a unit of a frame to generate the image data RGB. The control circuit 333*a* may provide the gate control signal GCS to the gate driver 310, and provide the source control signal SCS and the image data RGB to the source driver 320.

In the standby mode, the control circuit 333*a* may provide the enable signal EN in an activated state, e.g., a state in which the enable signal EN has a logic high value, to the internal clock generator 332. The internal clock generator 332 may be turned on in response to the enable signal EN in the activated state to generate the internal clock signal ICLK.

In the standby mode, the control circuit 333*a* may generate the gate control signal GCS and the source control signal SCS based on the internal clock signal ICLK.

The control circuit 333*a* may determine the current time based on the internal clock signal ICLK. In an exemplary embodiment, the control circuit 333*a* may receive the current time from the application processor 100 when the mobile device 10 is in the standby mode, and determine the current time by counting the internal clock signal ICLK during the standby mode, for example.

The control circuit 333*a* may determine the current hour hand coordinate CHHC (refer to FIG. 3) corresponding to the current time among the hour hand coordinates HHC[1], HHC[2], . . . , HHC[s] stored in the first register 331*a*, and determine the current minute hand coordinate CMHC (refer to FIG. 3) corresponding to the current time among the minute hand coordinates MHC[1], MHC[2], . . . , MHC[60] stored in the second register 331*b*.

In an exemplary embodiment, the control circuit 333*a* may determine the current hour hand coordinate CHHC by circularly selecting the current time among the hour hand coordinates HHC[1], HHC[2], . . . , HHC[s] stored in the first register 331*a* at each of the first time interval, and determine the current minute hand coordinate CMHC by circularly selecting the minute hand coordinates MHC[1], MHC[2], . . . , MHC[60] stored in the second register 331*b* whenever a minute of the current time is changed, for example.

The control circuit 333*a* may generate the image data RGB corresponding to the analog clock that includes the current hour hand line CHHL (refer to FIG. 3), which connects the reference coordinate RC and the current hour hand coordinate CHHC, and the current minute hand line CMHL (refer to FIG. 3), which connects the reference coordinate RC and the current minute hand coordinate CMHC.

The control circuit 333*a* may provide the gate control signal GCS to the gate driver 310 and provide the source control signal SCS and the image data RGB to the source driver 320.

As described above with reference to FIGS. 1 to 7, in the mobile device 10 according to exemplary embodiments, the application processor 100 may be in the idle state, and the display device 200 may determine the current hour hand coordinate CHHC and the current minute hand coordinate CMHC, which correspond to the current time, based on the hour hand coordinates HHC[1], HHC[2], . . . , HHC[s] and the minute hand coordinates MHC[1], MHC[2], . . . , MHC[60] that are internally stored, generate the image data RGB corresponding to the analog clock that includes the current hour hand line CHHL, which connects the reference coordinate RC and the current hour hand coordinate CHHC, and the current minute hand line CMHL, which connects the reference coordinate RC and the current minute hand coordinate CMHC, and display the image data RGB on the display panel 400. Therefore, the mobile device 10 according to exemplary embodiments may effectively reduce power consumption in the standby mode.

Figure 8:
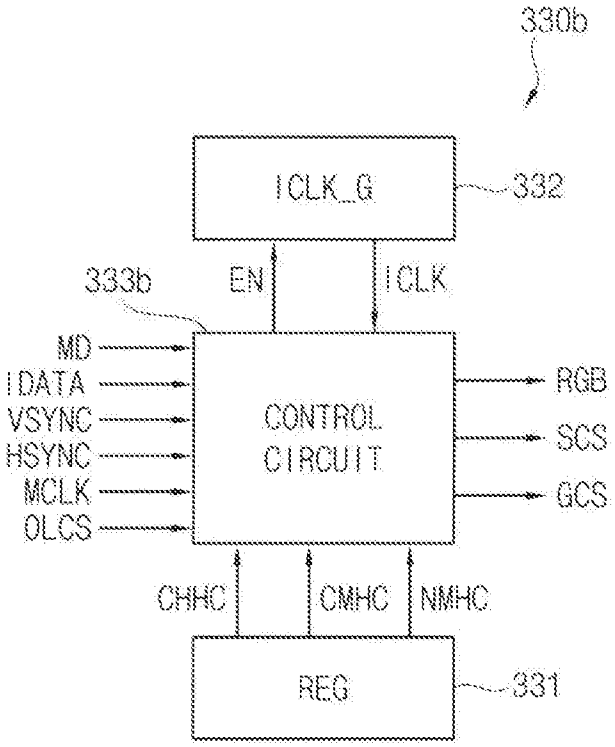
FIG. 8 is a block diagram illustrating an exemplary embodiment of a controller included in the display device of FIG. 4.

FIG. 8 is a block diagram illustrating an exemplary embodiment of a controller included in the display device of FIG. 4.

Referring to FIG. 8, a controller 330*b* may include a register 331, an internal clock generator ICLK_G 332, and a control circuit 333*b*.

The register 331 and the internal clock generator 332 included in the controller 330*b* of FIG. 8 may be the same as the register 331 and the internal clock generator 332 included in the controller 330*a* of FIG. 5. Therefore, detailed description about the register 331 and the internal clock generator 332 included in the controller 330*b* of FIG. 8 will be omitted.

The control circuit 333*b* may receive the mode signal MD from the application processor 100, and determine the operation mode based on the mode signal MD.

In the normal operation mode, the control circuit 333*b* may provide an enable signal EN in a deactivated state to the internal clock generator 332. The internal clock generator 332 may be turned off in response to the enable signal EN in the deactivated state.

In the normal operation mode, the control circuit 333*b* may receive the input data IDATA, the horizontal synchronization signal HSYNC, the vertical synchronization signal VSYNC, and the main clock signal MCLK from the application processor 100 (refer to FIG. 1). The control circuit 333*b* may generate the gate control signal GCS and the source control signal SCS based on the horizontal synchronization signal HSYNC, the vertical synchronization signal VSYNC, and the main clock signal MCLK. In addition, the control circuit 333*b* may divide the input data IDATA in a unit of a frame to generate the image data RGB. The control circuit 333*b* may provide the gate control signal GCS to the gate driver 310, and provide the source control signal SCS and the image data RGB to the source driver 320.

In the standby mode, the control circuit 333*b* may provide the enable signal EN in an activated state to the internal clock generator 332. The internal clock generator 332 may be turned on in response to the enable signal EN in the activated state to generate the internal clock signal ICLK.

In the standby mode, the control circuit 333*b* may generate the gate control signal GCS and the source control signal SCS based on the internal clock signal ICLK.

The control circuit 333*b* may determine the current time based on the internal clock signal ICLK. In an exemplary embodiment, the control circuit 333*b* may receive the current time from the application processor 100 when the mobile device 10 (refer to FIGS. 1 and 2) is in the standby mode, and determine the current time by counting the internal clock signal ICLK during the standby mode, for example.

The control circuit 333*b* may determine the current hour hand coordinate CHHC corresponding to the current time among the hour hand coordinates HHC[1], HHC[2], . . . , HHC[s] stored in the first register 331*a* (refer to FIG. 6), and determine the current minute hand coordinate CMHC corresponding to the current time among the minute hand coordinates MHC[1], MHC[2], . . . , MHC[60] stored in the second register 331*b* (refer to FIG. 6).

In an exemplary embodiment, the control circuit 333*b* may determine the current hour hand coordinate CHHC by circularly selecting the current time among the hour hand coordinates HHC[1], HHC[2], . . . , HHC[s] stored in the first register 331*a* at each of the first time interval, and determine the current minute hand coordinate CMHC by circularly selecting the minute hand coordinates MHC[1], MHC[2], . . . , MHC[60] stored in the second register 331*b* whenever a minute of the current time is changed, for example.

In addition, the control circuit 333*b* may determine a next minute hand coordinate NMHC, which corresponds to a next minute of the current hour, among the minute hand coordinates MHC[1], MHC[2], . . . , MHC[60] stored in the second register 331*b* during an overlap period, which is between a first time at which a minute of the current time is changed and a second time that is prior to the first time by a first time period.

In exemplary embodiments, a duration of the overlap period may be predetermined. In an exemplary embodiment, the duration of the overlap period may correspond to one second, for example. In this case, the overlap period may correspond to a period of one second from 59 second to 00 second in every minute. In an exemplary embodiment, referring to FIGS. 6 and 7, when the current time is 3:00:59, the current hour hand coordinate CHHC may correspond to the hour hand coordinate HHC[15], the current minute hand coordinate CMHC may correspond to the minute hand coordinate MHC[60], and the next minute hand coordinate NMHC may correspond to the minute hand coordinate MHC[1], for example.

In other exemplary embodiments, the control circuit 333*b* may adjust the duration of the overlap period based on an overlap control signal OLCS. The overlap control signal OLCS may be provided by the application processor 100.

When the current time is not included in the overlap period, the control circuit 333*b* may generate the image data RGB corresponding to the analog clock that includes the current hour hand line CHHL, which connects the reference coordinate RC and the current hour hand coordinate CHHC, and the current minute hand line CMHL, which connects the reference coordinate RC and the current minute hand coordinate CMHC. The current hour hand line CHHL and the current minute hand line CMHL included in the image data RGB may have a first gray level.

When the current time is included in the overlap period, the control circuit 333*b* may generate the image data RGB corresponding to the analog clock that includes the current hour hand line CHHL, which connects the reference coordinate RC and the current hour hand coordinate CHHC, the current minute hand line CMHL, which connects the reference coordinate RC and the current minute hand coordinate CMHC, and the next minute hand line NMHL, which connects the reference coordinate RC and the next minute hand coordinate NMHC. In this case, the current hour hand line CHHL and the current minute hand line CMHL included in the image data RGB may have the first gray level, and the next minute hand line NMHL included in the image data RGB may have a second gray level lower than the first gray level.

The control circuit 333*b* may provide the gate control signal GCS to the gate driver 310 and provide the source control signal SCS and the image data RGB to the source driver 320.

Therefore, in the standby mode, the source driver 320 may display the current hour hand line CHHL and the current minute hand line CMHL on the display panel 400 with a first brightness and display the next minute hand line NMHL on the display panel 400 with a second brightness lower than the first brightness based on the image data RGB received from the control circuit 333*b*. The first brightness may correspond to the first gray level, and the second brightness may correspond to the second gray level.

Figure 9:
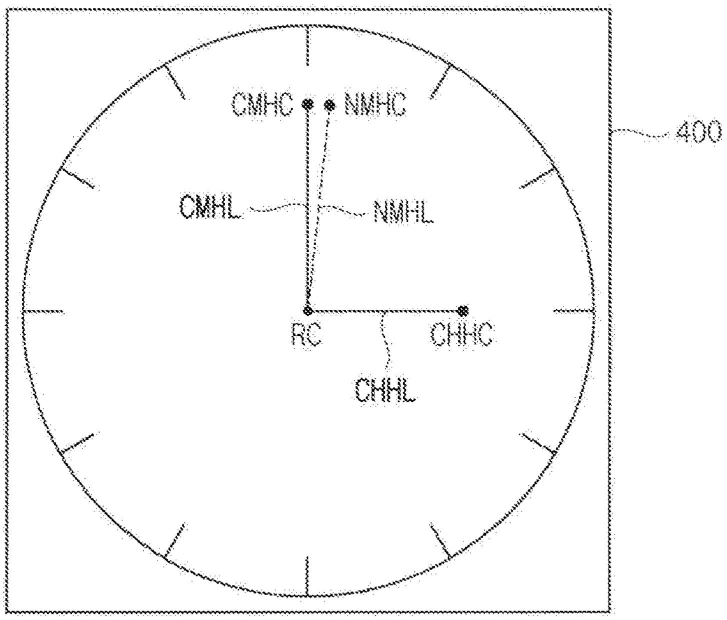
FIGS. 9 and 10 are diagrams for describing an operation of the mobile device of FIG. 1 when the mobile device includes the controller of FIG. 8.
Figure 10:
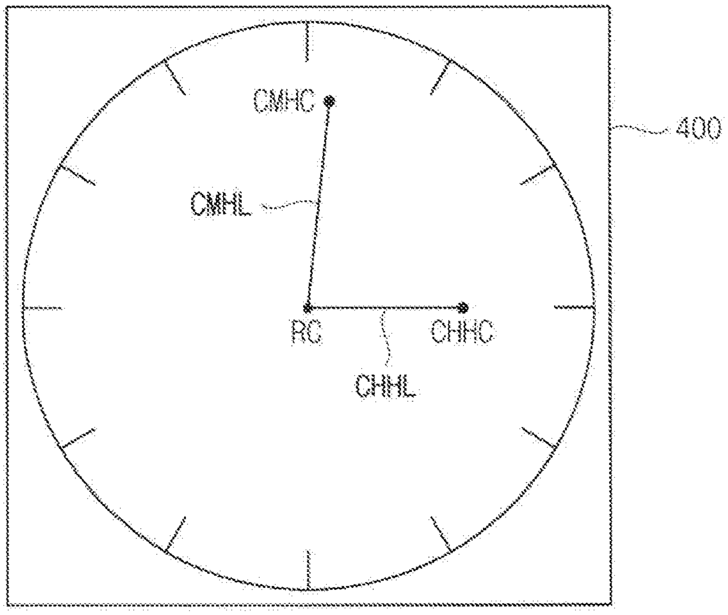

FIGS. 9 and 10 are diagrams for describing an operation of the mobile device of FIG. 1 when the mobile device includes the controller of FIG. 8.

FIG. 9 represents an image displayed on the display panel 400 in the standby mode when the duration of the overlap period is one second and the current time is 3:00:59, and FIG. 10 represents an image displayed on the display panel 400 in the standby mode when the duration of the overlap period is one second and the current time is 3:01:00.

As described above with reference to FIG. 8, when the duration of the overlap period is one second, the overlap period may correspond to a period of one second from 59 second to 00 second in every minute.

When the current time is 3:00:59, the current time may be included in the overlap period. Therefore, as illustrated in FIG. 9, the current hour hand line CHHL and the current minute hand line CMHL may be displayed on the display panel 400 with the first brightness, and the next minute hand line NMHL may be displayed on the display panel 400 with the second brightness lower than the first brightness.

When the current time is after 3:01:00, the current time may not be included in the overlap period. Therefore, as illustrated in FIG. 10, the current hour hand line CHHL and the current minute hand line CMHL may be displayed on the display panel 400 with the first brightness, and the next minute hand line NMHL may not be displayed on the display panel 400.

As described above with reference to FIGS. 1 to 10, in the mobile device 10 according to exemplary embodiments, the application processor 100 may be in the idle state, and the display device 200 may determine the current hour hand coordinate CHHC and the current minute hand coordinate CMHC, which correspond to the current time, based on the hour hand coordinates HHC[1], HHC[2], . . . , HHC[s] and the minute hand coordinates MHC[1], MHC[2], . . . , MHC[60] that are internally stored, generate the image data RGB corresponding to the analog clock that includes the current hour hand line CHHL, which connects the reference coordinate RC and the current hour hand coordinate CHHC, and the current minute hand line CMHL, which connects the reference coordinate RC and the current minute hand coordinate CMHC, and display the image data RGB on the display panel 400. Therefore, the mobile device 10 according to exemplary embodiments may effectively reduce power consumption in the standby mode.

In addition, in the standby mode, the display device 200 may display the current hour hand line CHHL and the current minute hand line CMHL on the display panel 400 with the first brightness, and pre-display the next minute hand line NMHL on the display panel 400 with the second brightness lower than the first brightness during the overlap period. Then, when the overlap period is finished and a minute of the current time is changed, a brightness of the next minute hand line NMHL may be changed from the second brightness to the first brightness to be displayed on the display panel 400 as the current minute hand line CMHL. As described above, since the display device 200 pre-displays the next minute hand line NMHL with a low brightness and increases the brightness of the next minute hand line NMHL when a minute of the current time is changed, a color bleed of the display device 200 may be effectively reduced.

Figure 11:
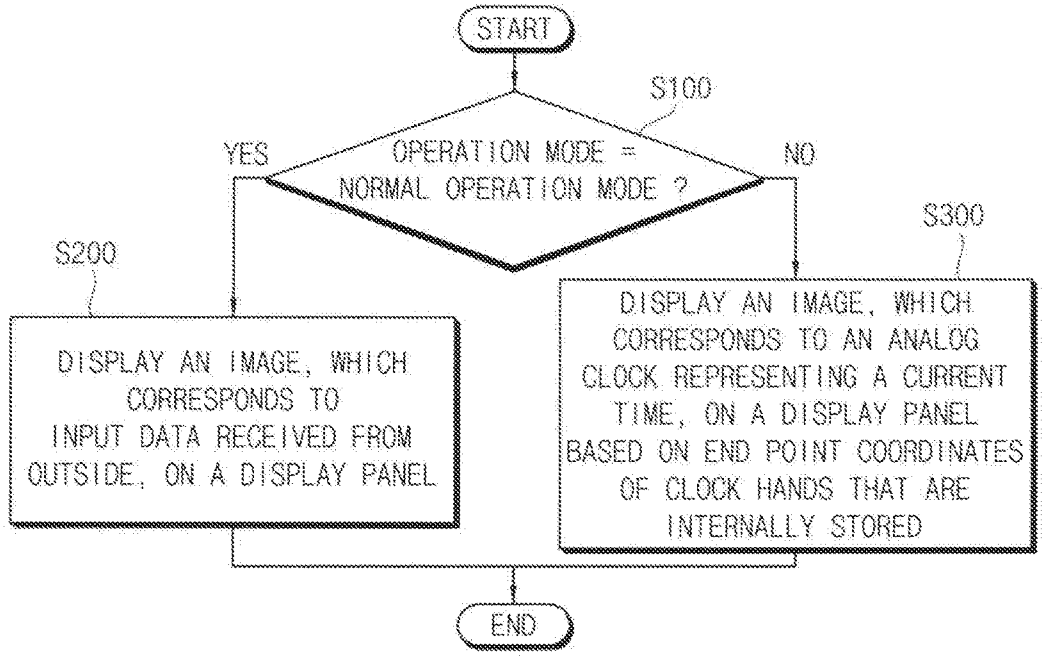
FIG. 11 is a flow chart illustrating exemplary embodiments of a method of operating a display device.

FIG. 11 is a flow chart illustrating a method of operating a display device according to exemplary embodiments.

The method of operating a display device of FIG. 11 may be performed by the display device 200 included in the mobile device 10 of FIG. 1.

Hereinafter, the method of operating the display device 200 will be described with reference to FIGS. 1 and 11.

Referring to FIGS. 1 and 11, the controller 330 included in the display device 200 may determine the operation mode based on the mode signal MD received from the application processor 100 (operation S100). The controller 330 may operate in the normal operation mode when the mode signal MD is in the first logic level, and operate in the standby mode when the mode signal MD is in the second logic level.

When the operation mode is the normal operation mode, the controller 330 may display an image corresponding to the input data IDATA received from the application processor 100 on the display panel 400 (operation S200).

When the operation mode is the standby mode, the controller 330 may display an image corresponding to the analog clock representing the current time on the display panel 400 based on the end point coordinates of clock hands stored in the register 331 (operation S300). As described above, the end point coordinates of clock hands may include the hour hand coordinates HHC[1], HHC[2], . . . , HHC[s] and the minute hand coordinates MHC[1], MHC[2], . . . , MHC[t].

Figure 12:
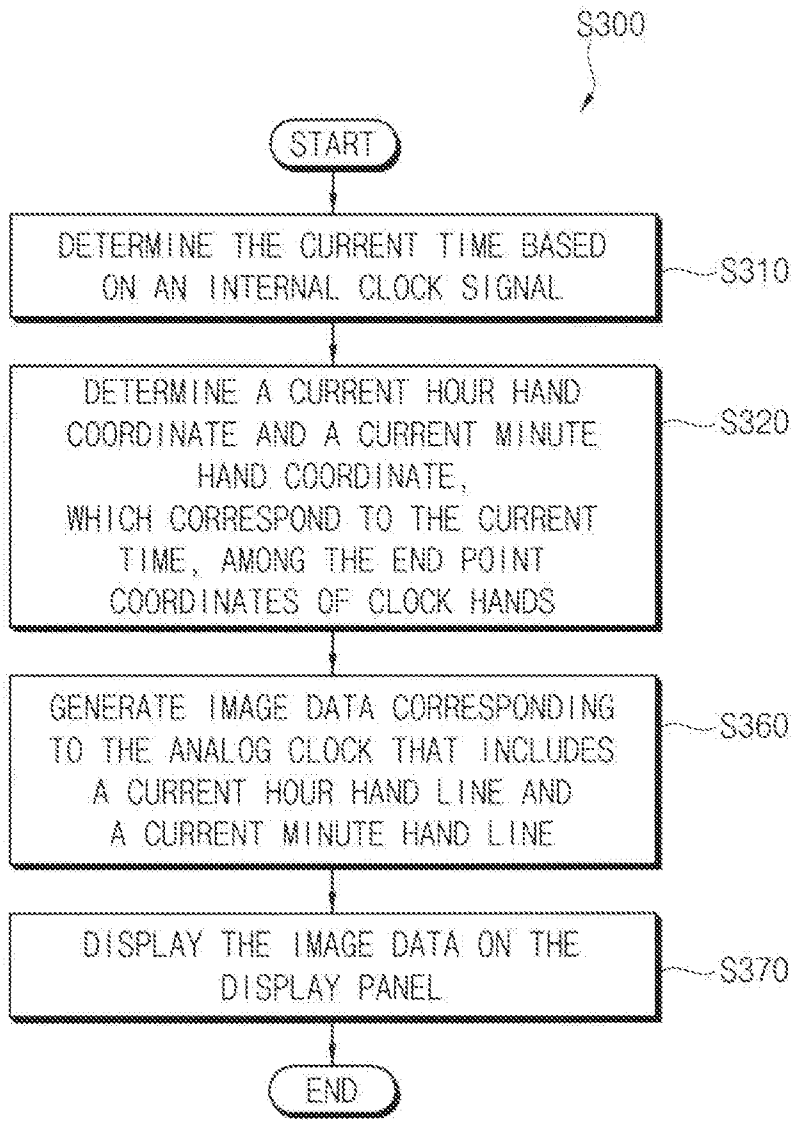
FIG. 12 is a flow chart illustrating an exemplary embodiment of an operation of the display device of FIG. 11 in a standby mode.

FIG. 12 is a flow chart illustrating an exemplary embodiment of an operation of the display device of FIG. 11 in a standby mode.

Referring to FIG. 12, in the standby mode, the controller 330 (refer to FIG. 4) may determine the current time based on the internal clock signal ICLK (refer to FIG. 5) generated by the internal clock generator 332 (refer to FIG. 5) (operation S310).

The controller 330 may determine the current hour hand coordinate CHHC (refer to FIG. 3) corresponding to the current time among the hour hand coordinates HHC[1], HHC[2], . . . , HHC[s] (refer to FIG. 6) stored in the first register 331*a* (refer to FIG. 6), and determine the current minute hand coordinate CMHC (refer to FIG. 3) corresponding to the current time among the minute hand coordinates MHC[1], MHC[2], . . . , MHC[60] (refer to FIG. 6) stored in the second register 331*b* (refer to FIG. 6) (operation S320).

Then, the controller 330 may generate the image data RGB corresponding to the analog clock that includes the current hour hand line CHHL, which connects the reference coordinate RC stored in the third register 331*c* (refer to FIG. 6) and the current hour hand coordinate CHHC, and the current minute hand line CMHL (refer to FIG. 3), which connects the reference coordinate RC (refer to FIG. 3) and the current minute hand coordinate CMHC (operation S360).

The controller 330 may provide the image data RGB to the source driver 320 (refer to FIG. 4), and the source driver 320 may display an image corresponding to the analog clock on the display panel 400 (refer to FIG. 3) based on the image data RGB (operation S370).

Figure 13:
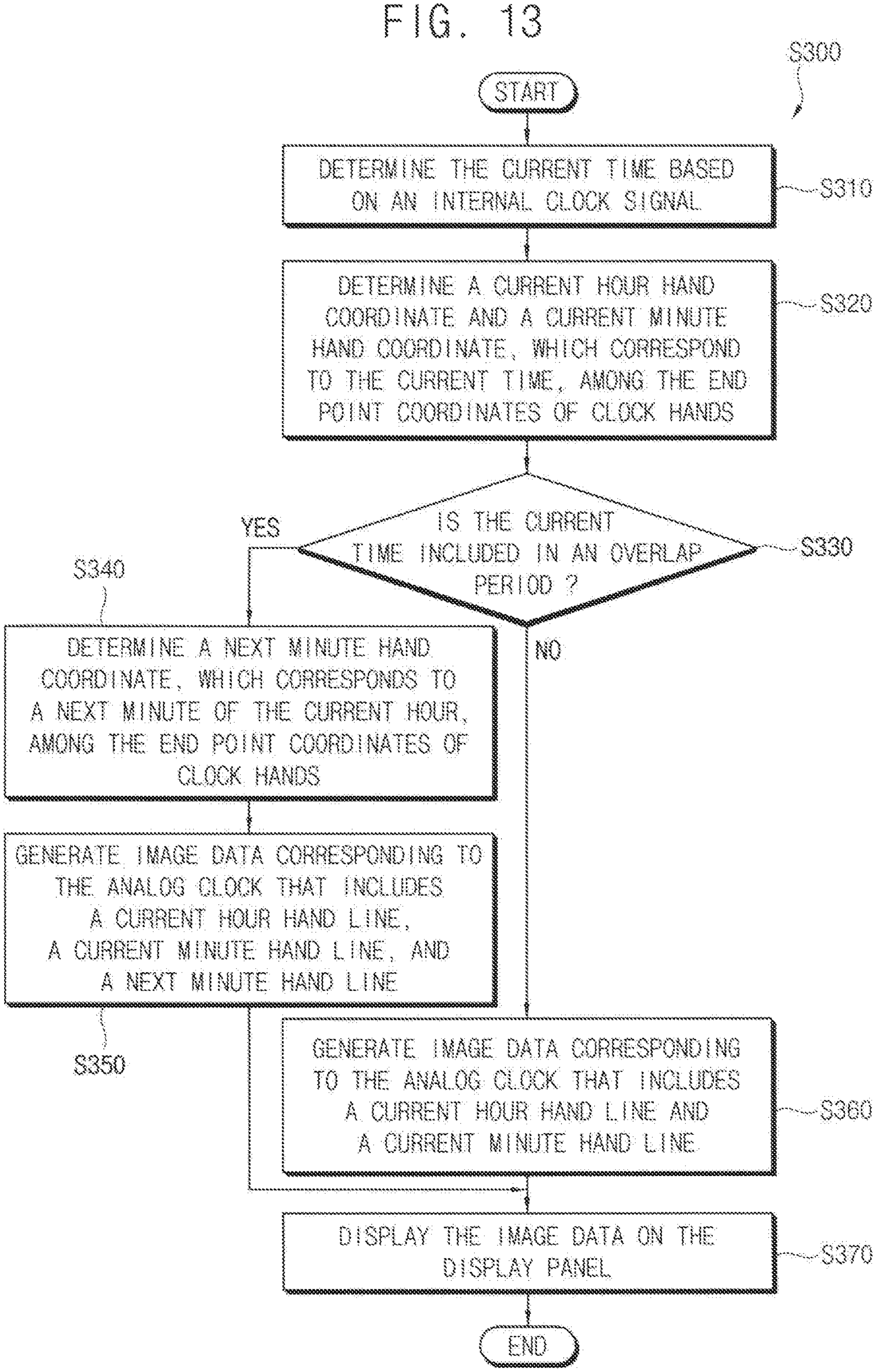
FIG. 13 is a flow chart illustrating an exemplary embodiment of an operation of the display device of FIG. 11 in a standby mode.

FIG. 13 is a flow chart illustrating an exemplary embodiment of an operation of the display device of FIG. 11 in a standby mode.

Referring to FIG. 13, in the standby mode, the controller 330 (refer to FIG. 4) may determine the current time based on the internal clock signal ICLK (refer to FIG. 8) generated by the internal clock generator 332 (refer to FIG. 8) (operation S310).

The controller 330 may determine the current hour hand coordinate CHHC (refer to FIG. 9) corresponding to the current time among the hour hand coordinates HHC[1], HHC[2], . . . , HHC[s] (refer to FIG. 6) stored in the first register 331*a* (refer to FIG. 6), and determine the current minute hand coordinate CMHC (refer to FIG. 9) corresponding to the current time among the minute hand coordinates MHC[1], MHC[2], . . . , MHC[60] (refer to FIG. 6) stored in the second register 331*b* (refer to FIG. 6) (operation S320).

In addition, the controller 330 may determine whether the current time is included in the overlap period, which is between a first time at which a minute of the current time is changed and a second time that is prior to the first time by a first time period (operation S330).

When the current time is not included in the overlap period (operation S330; no), the controller 330 may generate the image data RGB corresponding to the analog clock that includes the current hour hand line CHHL (refer to FIG. 9), which connects the reference coordinate RC (refer to FIG. 6) stored in the third register 331*c* (refer to FIG. 6) and the current hour hand coordinate CHHC, and the current minute hand line CMHL (refer to FIG. 9), which connects the reference coordinate RC and the current minute hand coordinate CMHC (operation S360). The current hour hand line CHHL and the current minute hand line CMHL included in the image data RGB may have the first gray level.

The controller 330 may provide the image data RGB to the source driver 320 (refer to FIG. 4), and the source driver 320 may display an image corresponding to the analog clock on the display panel 400 based on the image data RGB (operation S370). Therefore, the current hour hand line CHHL and the current minute hand line CMHL may be displayed on the display panel 400 with the first brightness corresponding to the first gray level.

When the current time is included in the overlap period (operation S330; yes), the controller 330 may determine the next minute hand coordinate NMHC (refer to FIGS. 8 and 9), which corresponds to a next minute of the current hour, among the minute hand coordinates MHC[1], MHC[2], . . . , MHC[60] stored in the second register 331*b* (operation S340).

Then, the controller 330 may generate the image data RGB corresponding to the analog clock that includes the current hour hand line CHHL, which connects the reference coordinate RC stored in the third register 331*c* and the current hour hand coordinate CHHC, the current minute hand line CMHL, which connects the reference coordinate RC and the current minute hand coordinate CMHC, and the next minute hand line NMHL, which connects the reference coordinate RC and the next minute hand coordinate NMHC (operation S350). In this case, the current hour hand line CHHL and the current minute hand line CMHL included in the image data RGB may have the first gray level, and the next minute hand line NMHL (refer to FIG. 9) included in the image data RGB may have the second gray level lower than the first gray level.

The controller 330 may provide the image data RGB to the source driver 320, and the source driver 320 may display an image corresponding to the analog clock on the display panel 400 based on the image data RGB (operation S370). Therefore, the current hour hand line CHHL and the current minute hand line CMHL may be displayed on the display panel 400 with the first brightness corresponding to the first gray level, and the next minute hand line NMHL may be displayed on the display panel 400 with the second brightness lower than the first brightness.

Since a structure and an operation of the display device 200 are described above with reference to FIGS. 1 to 10, detailed description about the operations of FIGS. 11 to 13 will be omitted here.

Figure 14:
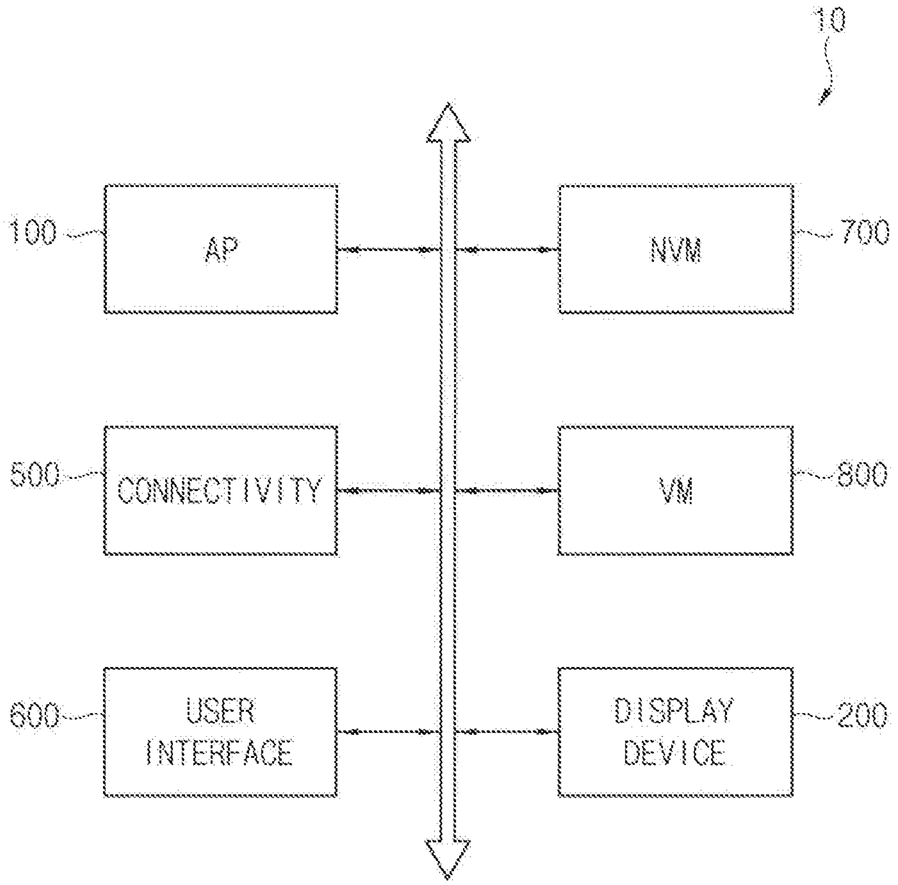
FIG. 14 is a block diagram illustrating an exemplary embodiment of the mobile device of FIG. 1.

FIG. 14 is a block diagram illustrating an exemplary embodiment of the mobile device of FIG. 1.

Referring to FIG. 14, a mobile device 10 may include an application processor AP 100, a connectivity circuit 500, a user interface 600, a nonvolatile memory device NVM 700, a volatile memory device VM 800, and a display device 200.

The nonvolatile memory device 700 may store a boot image for booting the mobile device 10. In an exemplary embodiment, the nonvolatile memory device 700 may store multimedia data. In an exemplary embodiment, the nonvolatile memory device 700 may be an electrically erasable programmable read-only memory ("EEPROM"), a flash memory, a phase change random access memory ("PRAM"), a resistance random access memory ("RRAM"), a nano floating gate memory ("NFGM"), a polymer random access memory ("PoRAM"), a magnetic random access memory ("MRAM"), a ferroelectric random access memory ("FRAM"), etc., for example.

In an exemplary embodiment, the application processor 100 may execute applications, such as a web browser, a game application, a video player, etc., in a normal operation mode. In an exemplary embodiment, the application processor 100 may read the multimedia data from the nonvolatile memory device 700, generate input data corresponding to the multimedia data, and provide the input data to the display device 200 in the normal operation mode. In a standby mode, the application processor 100 may be in an idle state. In exemplary embodiments, the application processor 100 may include a single core or multiple cores. In an exemplary embodiment, the application processor 100 may be a multi-core processor, such as a dual-core processor, a quad-core processor, a hexa-core processor, etc., for example. The application processor 100 may include an internal or external cache memory.

The connectivity circuit 500 may perform wired or wireless communication with an external device. In an exemplary embodiment, the connectivity circuit 500 may perform Ethernet communication, near field communication ("NFC"), radio frequency identification ("RFID") communication, mobile telecommunication, memory card communication, universal serial bus ("USB") communication, etc., for example. In exemplary embodiments, the connectivity circuit 500 may include a baseband chipset that supports communications, such as global system for mobile communications ("GSM"), general packet radio service ("GPRS"), wideband code division multiple access ("WCDMA"), high speed downlink/uplink packet access ("HSxPA"), etc., for example.

The volatile memory device 800 may store data processed by the application processor 100, or may operate as a working memory.

In an exemplary embodiment, the user interface 600 may include at least one input device, such as a keypad, a touch screen, etc., and at least one output device, such as a speaker, a printer, etc., for example.

The display device 200 may display the input data provided from the application processor 100 in the normal operation mode. The display device 200 may internally generate an image corresponding to an analog clock representing a current time and display the image in the standby mode. The display device 200 may be implemented with the display device 200 of FIG. 1. A structure and an operation of the display device 200 of FIG. 1 are described above with reference to FIGS. 1 to 13. Therefore, a detailed description of the display device 200 will be omitted.

In exemplary embodiments, the mobile device 10 may further include an image processor, and/or a storage device, such as a memory card, a solid state drive ("SSD"), etc.

In exemplary embodiments, the mobile device 10 and/or components of the mobile device 10 may be packaged in various forms, such as package on package ("PoP"), ball grid arrays ("BGAs"), chip scale packages ("CSPs"), plastic leaded chip carrier ("PLCC"), plastic dual in-line package ("PDIP"), die in waffle pack, die in wafer form, chip on board ("COB"), ceramic dual in-line package ("CERDIP"), plastic metric quad flat pack ("MQFP"), thin quad flat pack ("TQFP"), small outline IC ("SOIC"), shrink small outline package ("SSOP"), thin small outline package ("TSOP"), system in package ("SIP"), multi chip package ("MCP"), wafer-level fabricated package ("WFP"), or wafer-level processed stack package ("WSP").

The foregoing is illustrative of the invention and is not to be construed as limiting thereof. Although a few exemplary embodiments have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the claims.

What is claimed is:

1. A display device comprising:

a display panel including a plurality of pixels; and a drive circuit which, displays an image, which corresponds to input data received from outside, on the display panel in a normal operation mode in which the display device operates based on a command from a user, and displays an image, which corresponds to an analog clock representing a current time, on the display panel based on end point coordinates of clock hands, which are internally stored in the drive circuit, in a standby mode in which the display device is not used by the user and waits for a command from the user, wherein, in the standby mode, the drive circuit generates an internal clock signal, determines a current hour hand coordinate and a current minute hand coordinate among the end point coordinates of clock hands based on the internal clock signal, and displays a current hour hand line, which connects a reference coordinate which is internally stored in the drive circuit and the current hour hand coordinate, and a current minute hand line, which connects the reference coordinate and the current minute hand coordinate, on the display panel.

2. The display device of claim 1, wherein the drive circuit includes:

a gate driver coupled to the display panel through a plurality of gate lines;

a source driver coupled to the display panel through a plurality of data lines; and a controller which, controls operations of the gate driver and the source driver, generates image data corresponding to the input data and provide the image data to the source driver in the normal operation mode, and generates image data corresponding to the analog clock representing the current time based on the end point coordinates of clock hands and an internal clock signal and provide the image data to the source driver in the standby mode.

3. The display device of claim 2, wherein the controller includes:

a register which stores the end point coordinates of clock hands and a reference coordinate corresponding to a center of the analog clock;

an internal clock generator which generates the internal clock signal; and a control circuit which, generates the image data by dividing the input data in a unit of a frame and provides the image data to the source driver in the normal operation mode, and determines the current time based on the internal clock signal, determines a current hour hand coordinate and a current minute hand coordinate, which correspond to the current time, among the end point coordinates of clock hands, generates the image data including a current hour hand line, which connects the reference coordinate and the current hour hand coordinate, and a current minute hand line, which connects the reference coordinate and the current minute hand coordinate, and provides the image data to the source driver in the standby mode.

4. The display device of claim 3, wherein the register includes:

a first register which stores hour hand coordinates representing locations of end points of an hour hand at a predetermined time interval;

a second register which stores minute hand coordinates representing locations of end points of a minute hand at every minute; and a third register which stores the reference coordinate.

5. The display device of claim 4, wherein, in the standby mode, the control circuit determines the current hour hand coordinate, which corresponds to the current time, among the hour hand coordinates stored in the first register, and determines the current minute hand coordinate, which corresponds to the current time, among the minute hand coordinates stored in the second register.

6. The display device of claim 4, wherein, in the standby mode, the control circuit determines the current hour hand coordinate by circularly selecting the hour hand coordinates stored in the first register at each of the predetermined time interval, and determines the current minute hand coordinate by circularly selecting the minute hand coordinates stored in the second register whenever a minute of the current time is changed.

7. The display device of claim 3, wherein, in the standby mode, the control circuit determines a next minute hand coordinate, which corresponds to a next minute of the current hour, among the end point coordinates of clock hands during an overlap period, which is between a first time at which a minute of the current time is changed and a second time which is prior to the first time by a first time period, generates the image data including the current hour hand line, the current minute hand line, and a next minute hand line, which connects the reference coordinate and the next minute hand coordinate, and provides the image data to the source driver.

8. The display device of claim 7, wherein the current hour hand line and the current minute hand line included in the image data has a first gray level, and the next minute hand line included in the image data has a second gray level lower than the first gray level.

9. The display device of claim 8, wherein, in the standby mode, the source driver displays the current hour hand line and the current minute hand line on the display panel with a first brightness and displays the next minute hand line on the display panel with a second brightness lower than the first brightness based on the image data received from the control circuit.

10. The display device of claim 7, wherein a duration of the overlap period is predetermined.

11. The display device of claim 7, wherein the control circuit adjusts a duration of the overlap period based on an overlap control signal.

12. A mobile device comprising:

an application processor which, generates a mode signal having a first logic level and output input data in a normal operation mode, and generates the mode signal having a second logic level and stop outputting the input data in a standby mode; and a display device which, receives the mode signal, displays an image corresponding to the input data in the normal operation mode in which the mobile device operates based on a command from a user, and displays an image corresponding to an analog clock representing a current time based on end point coordinates of clock hands, which are internally stored in the display device, in a standby mode in which the mobile device is not used by the user and waits for a command from the user, wherein, in the standby mode, the drive circuit generates an internal clock signal, determines a current hour hand coordinate and a current minute hand coordinate among the end point coordinates of clock hands based on the internal clock signal, and displays a current hour hand line, which connects a reference coordinate which is internally stored in the drive circuit and the current hour hand coordinate, and a current minute hand line, which connects the reference coordinate and the current minute hand coordinate, on the display panel.

13. The mobile device of claim 12, wherein the display device includes:

a display panel including a plurality of pixels;

a gate driver coupled to the display panel through a plurality of gate lines;

a source driver coupled to the display panel through a plurality of data lines; and a controller which, controls operations of the gate driver and the source driver, receives the mode signal, generates image data corresponding to the input data and provide the image data to the source driver in the normal operation mode, and generates image data corresponding to the analog clock representing the current time based on the end point coordinates of clock hands and an internal clock signal and provide the image data to the source driver in the standby mode.

14. The mobile device of claim 13, wherein the controller includes:

a register which stores the end point coordinates of clock hands and a reference coordinate corresponding to a center of the analog clock;

an internal clock generator which generates the internal clock signal; and a control circuit which, generates the image data by dividing the input data in a unit of a frame and provides the image data to the source driver in the normal operation mode, and determines the current time based on the internal clock signal, determines a current hour hand coordinate and a current minute hand coordinate, which correspond to the current time, among the end point coordinates of clock hands, generates the image data including a current hour hand line, which connects the reference coordinate and the current hour hand coordinate, and a current minute hand line, which connects the reference coordinate and the current minute hand coordinate, and provides the image data to the source driver in the standby mode.

15. The mobile device of claim 14, wherein, in the standby mode, the control circuit determines a next minute hand coordinate, which corresponds to a next minute of the current hour, among the end point coordinates of clock hands during an overlap period, which is between a first time at which a minute of the current time is changed and a second time which is prior to the first time by a first time period, generates the image data, which include the current hour hand line and the current minute hand line with a first gray level, and a next minute hand line connecting the reference coordinate and the next minute hand coordinate with a second gray level lower than the first gray level, and provides the image data to the source driver.

16. The mobile device of claim 12, wherein the mobile device corresponds to a smart watch.

17. A method of operating a display device, the method comprising:

determining an operation mode;

displaying an image, which corresponds to input data received from outside, on a display panel when the operation mode is a normal operation mode in which the display device operates based on a command from a user; and displaying an image, which corresponds to an analog clock representing a current time, on the display panel based on end point coordinates of clock hands, which are internally stored in the display device, when the operation mode is a standby mode in which the display device is not used by the user and waits for a command from the user, wherein displaying the image, which corresponds to the analog clock representing the current time, on the display panel based on the end point coordinates of clock hands when the operation mode is the standby mode includes:

determining the current time based on an internal clock signal;

determining a current hour hand coordinate and a current minute hand coordinate, which correspond to the current time, among the end point coordinates of clock hands;

generating image data corresponding to the analog clock which includes a current hour hand line, which connects a reference coordinate which is internally stored in the display device and the current hour hand coordinate, and a current minute hand line, which connects the reference coordinate and the current minute hand coordinate; and displaying the image data on the display panel.

18. The method of claim 17, wherein displaying the image, which corresponds to the analog clock representing the current time, on the display panel based on the end point coordinates of clock hands when the operation mode is the standby mode further includes:

determining a next minute hand coordinate, which corresponds to a next minute of the current hour, among the end point coordinates of clock hands during an overlap period, which is between a first time at which a minute of the current time is changed and a second time which is prior to the first time by a first time period; and generating the image data, which include the current hour hand line and the current minute hand line with a first gray level, and a next minute hand line connecting the reference coordinate and the next minute hand coordinate with a second gray level lower than the first gray level.

* * * * *